UNITED STATES PATENT OFFICE 2,577,477

TETRACYANOETHYL BENZOGUANAMINE

Warren D. Niederhauser, Philadelphia, Pa., assignor to Rohm & Haas Company, Philadelphia, Pa., a corporation of Delaware No Drawing. Application January 18, 1950, Serial No. 139,325

2 Claims. (Cl. 260—249.9)

This invention relates to tetracyanoethyl benzoguanamine and to a process for preparing it. This compound which has the formula

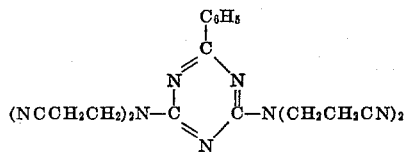

is prepared by the reaction of acrylonitrile and benzoguanamine according to the following equation:

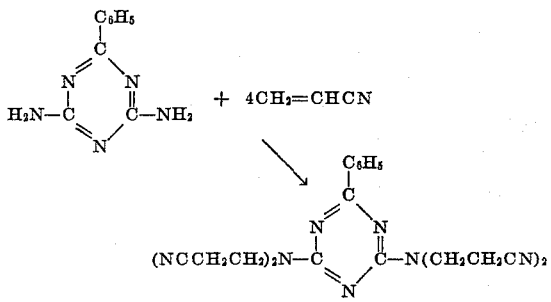

In the presence of a small amount of a strong base the reactants combine very readily. Suitable bases include sodium hydroxide, potassium hydroxide, and quaternary ammonium hydroxides such as trimethyl benzyl ammonium hydroxide. It is recommended that the reaction mixture be heated in order to accelerate the reaction and temperatures up to and including the refluxing temperature of the reaction mixture are operable. Solvents such as dioxane, dimethylformamide, or tertiary butanol can be employed. The product, a solid, is readily purified by recrystallization, for example, from Cellosolve or methyl ethyl ketone.

The new compound is a valuable intermediate for the preparation of polycarboxylic acids of benzoguanamine and the esters thereof. The polycarboxylic acids, in turn, containing up to four carboxyl groups, are useful in the manufacture of alkyd resins while the esters of the acids and monohydric alcohols have value as plasticizers. The unsaturated esters; e. g., the allyl or methallyl esters, may be used for the preparation of surface-coatings and plastics.

The preferred methods of preparing tetracyanoethyl benzoguanamine and hydrolyzing it to the tetracarboxyethyl benzoguanamine are set forth in the following examples.

Example 1

A mixture of 93 grams (0.5 mole) of benzoguanamine and 93 grams of acetonitrile was stirred and heated to 75° C. in a flask equipped with mechanical stirrer, thermometer, and reflux condenser. To this mixture was added four grams of powdered potassium hydroxide. Then, over a period of about twenty minutes, was slowly added 106 grams (2 moles) of acrylonitrile while the reaction-mixture was maintained at 70°–75° C. Heating at 75° C. was maintained for an hour, after which the mixture was cooled to 30° C. and then poured into 500 cc. of a 1% aqueous solution of acetic acid. The solid precipitate was filtered, washed with water, and air-dried to give 194 grams (98% yield) of a light gray crystalline compound. This material, impure tetracyanoethyl benzoguanamine, was recrystallized first from Cellosolve and then from methyl ethyl ketone, and the resultant purified product, which melted at 162°–163° C., was found to have the composition of tetracyanoethyl benzoguanamine as shown by the following analytical data: Carbon = 63.40%; hydrogen = 5.39%; nitrogen = 31.20%; and molecular weight=390. (Calculated values: Carbon=63.12%; hydrogen=5.30%; nitrogen=31.57%; and molecular weight=399).

Example 2

A mixture of 6.6 grams of tetracyanoethyl benzoguanamine, 24 grams of sodium hydroxide, and 150 grams of water was stirred and boiled under reflux for 15 hours. Thereafter the alkaline solution was acidified, and the precipitate was recrystallized from water. The product, a crystalline solid melting at 195°–196° C., had the formula

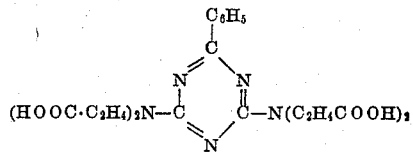

Its anaylsis showed a value for nitrogen of 14.25% as against a calculated value of 14.73% and its neutral equivalent was 122 as against a calculated value of 119.

This acid was esterified with 3,5,5-trimethylhexanol at 105°–110° C. Sulfuric acid (0.5%) was used as a catalyst. After being washed and stripped, the product was a highly viscous oil.

I claim:

1. Tetracyanoethyl benzoguanamine having the formula

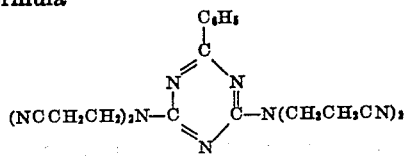

2. A process for preparing tetracyanoethyl benzoguanamine having the formula

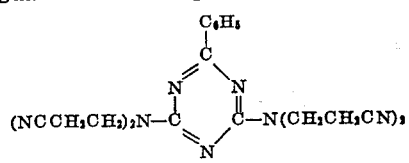

which comprises combining by heating four moles of acrylonitrile and one mole of benzoguanamine in the presence of a strong base.

WARREN D. NIEDERHAUSER.

REFERENCES CITED

The following references are of record in the file of this patent:

UNITED STATES PATENTS

| Number | Name | Date |
|---|---|---|
| 1,992,615 | Huffmar | Feb. 20, 1935 |

FOREIGN PATENTS

| Number | Country | Date |
|---|---|---|
| 62,989 | Denmark | 1944 |
| 457,621 | Great Britain | June 17, 1936 |
| 48,570 | France | 1938 |